Patented Sept. 23, 1924.

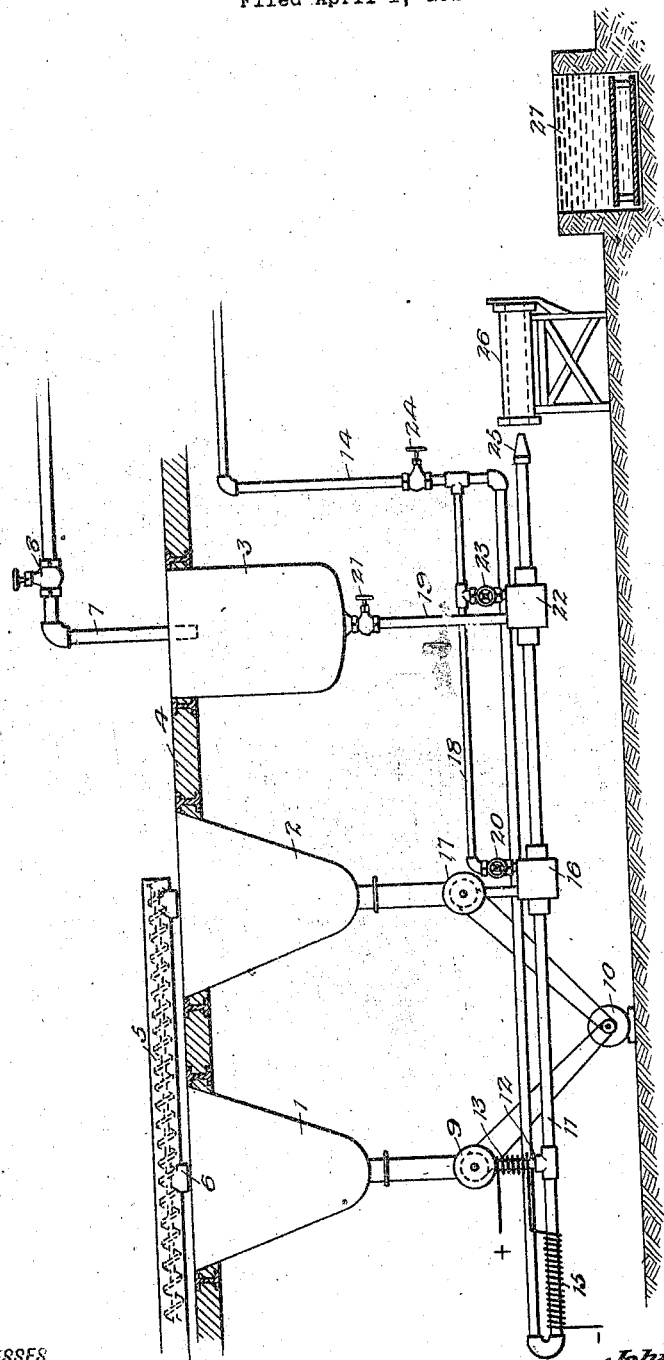

1,509,790

UNITED STATES PATENT OFFICE.

JOHN M. STEPHENSEN, OF BROOKLYN, NEW YORK.

PROCESS FOR MAKING ELECTRODES.

Application filed April 1, 1922. Serial No. 548,602.

*To all whom it may concern:*

Be it known that I, JOHN M. STEPHENSEN, a citizen of the United States, and a resident of the city of New York, borough of Brooklyn, in the county of Kings and State of New York, have invented new and useful Improvements in Processes for Making Electrodes, of which the following is a full, clear, and exact description.

This invention relates to a process for mixing pulverized solid materials with solid pulverized binders so that they form a plastic mass, and was primarily created for the preparation of electrodes.

Generally in the processes now used for making electrodes there is a great volume of dust created which is extremely injurious to laborers who are not only endeavoring to provide for their needs but who are also producing articles which are necessary in the various manufacturing industries that provide the goods demanded by the people. Consequently, taking into account the injury done to the laborers by the volumes of dust, many have endeavored to provide processes for the manufacture of electrodes which to a great extent eliminate the dust thus denying the industry the toll of human life which it demands.

The general object of the invention is the provision of a cheap, simple and efficient process for transforming pulverized materials into a plastic mass capable of being cast to the desired shape and size.

A further object is the provision of a process and apparatus for the manufacture of electrodes and the like that does not give rise to any considerable amount of dust which is likely to injure the laborers.

These objects are accomplished by feeding a pulverized body-giving material in a heated condition into pipe means and supplying a compressed heated fluid to force the pulverized material through the pipe means, and introducing into the pipe means a binder, and finally projecting the mixture into a mold.

These and other objects of the invention will be more clearly understood from the following detailed description which refers to the accompanying drawing.

The drawing shown is a diagram showing the equipment necessary for carrying out the process.

Referring to the above-mentioned drawing, three hoppers 1, 2 and 3 are supported in the floor 4. Conveyors 5 and 6 extend over the hoppers, the conveyor 6 serving to supply a solid pulverized material to hopper 1 while conveyor 5 supplies pulverized pitch to hopper 2. A tar oil or other suitable oil is supplied to hopper 3 through a pipe 7 controlled by a valve 8.

A feeding device 9 driven by a motor 10 is associated with the hopper 1 and serves to feed the solid pulverized material contained in hopper 1 into a pipe 11. As the solid pulverized material passes from the feeding device 9 through the pipe 12 into the pipe line 11 it is heated by the electric coil 13 mounted on the pipe 12 when the compressed air from any suitable source is fed through the pipe line 14 into the pipe line 11, forcing the heated solid pulverized material through the pipe line 11. The compressed air passing through the pipe line 14 is heated by an electric coil 15 mounted on the pipe 11. A casing 16 is interposed in the pipe line 11 and into this casing pulverized pitch is fed by means of a feeding device 17 which is driven by the motor 10. An auxiliary pipe line 18 is connected with the pipe line 14 and supplies compressed air to the casing 16. This serves to force the pulverized pitch entering the casing 16 into the pipe line 11, mixing it with the pulverized material passing through the pipe line. A valve 20 is provided for controlling the flow of compressed air into the casing 16.

Oil contained in the hopper 3 is fed into a casing 22 introduced into the pipe line 11 by means of a pipe 19 controlled by a valve 21. Compressed air is also fed into this casing from the auxiliary pipe line 18 and the flow of the compressed air is controlled by the valve 23. Thus the oil which serves to make the mixture more plastic is introduced. A valve 24 is supplied in the pipe line 14 to control the supply of compressed air.

The plastic mixture which arrives at the end of the pipe line 11 is extruded through an eccentrically mounted rotatable nozzle 25. This rotatable nozzle is operated by the air and mixture as they rush through the same. A mold 26 is mounted in alinement with the nozzle 25 and the mixture is sprayed around this mold by means of the eccentrically mounted nozzle 25. After the mold 26 has been filled it is fed to an ejector which removes the material therefrom and if it is desired to hasten the cooling of the molded material it may be placed in a water bath 27.

In making anodes molds such as 26 are used, but in order to make cathodes, which are usually large and of different shapes, the eccentrically mounted nozzle 25 would not be satisfactory. Consequently a flexible hose with a straight nozzle is substituted for the nozzle 25 and this and nozzle are used to spray the mixture into molds which may be of different sizes and shapes.

The solid prepared pulverized carbon used would depend on the qualities it is desired that the electrodes should have. The carbon selected is then heated and by the use of heated compressed air or other suitable fluid is forced through the pipe line 11. When it reaches casing 16 it is mixed with the solid pitch or other binder to heat the same and is finally forced along the pipe line to the casing 22 where the oil which increases the plasticity of the mixture is added. Then the plastic mixture is projected into a suitable mold. If, under certain conditions by heating the carbon and the air, a satisfactory mixture is not obtained provision may be made for heating the binder and the oil.

The process described above is for making raw electrodes which for certain purposes may be roasted to give the desired type of electrode. In other cases the electrodes are used without baking. These are known as self-baking electrodes since they are baked during their use. In the above description in the preferred process a carbon and a pitch binder are set forth but electrodes might be made from a carbon and the oil and this is sometimes the process used, the oil serving as the binder.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A process for preparing a mixture for making electrodes, comprising the forcing of a prepared carbon through a pipe line, and spraying a binder onto the prepared carbon as it passes along the pipe line.

2. A process for preparing a mixture for the making of electrodes, comprising the forcing of a prepared carbon through a confined channel by the use of a compressed fluid, and introducing a binder by spraying from all sides onto the carbon as it passes through the confined channel.

3. A process for preparing a mixture for the making of electrodes, comprising the forcing of a pulverized carbon through a pipe line, and spraying a binder onto the pulverized carbon as it passes through the pipe line.

4. A process for preparing a mixture for the making of electrodes, comprising the forcing of a pulverized carbon through a pipe line by the use of compressed air, introducing a binder through a spraying device associated with the pipe line, and supplying an oil to the mixture for increasing its plasticity.

5. A process for preparing a mixture for the making of electrodes, comprising the forcing of a pulverized carbon through a confined passage by the use of compressed air, heating said pulverized carbon and compressed air as they pass through the confined passage, and introducing a binder from all sides of the confined passage.

6. A process for preparing a mixture for making electrodes, comprising the forcing of a pulverized carbon through a pipe line, supplying heat to the said pulverized carbon as it passes through the pipe line, and introducing a binder into the pipe line to mix with the pulverized carbon after it has been heated.

7. A process for preparing a mixture for making electrodes, comprising the forcing of the pulverized carbon through a pipe line by the use of compressed air, heating the pulverized carbon and compressed air as it passes through said pipe line, introducing a binder through the circumferential spraying device associated with said pipe line, and supplying an oil to the mixture as it passes through the pipe line to increase its plasticity.

8. A process for preparing a mixture for making electrodes, comprising the forcing of a pulverized body-giving material through a pipe line by the use of compressed air, and introducing a binder to unite the pulverized material.

9. A process for the preparation of a mixture for the manufacture of electrodes, comprising the forcing of heated pulverized carbon through a pipe line by means of heated compressed air, and introducing into the pipe line from all sides a binder.

10. A process for the preparation of a mixture for the manufacture of electrodes, comprising the utilizing of heated compressed air to force pulverized carbon through a confined passage, supplying a binder to the heated pulverized carbon as it passes through the confined passage and introducing into the mixture an oil for increasing the plasticity of the mixture.

11. A process for preparing a mixture for the manufacture of self-baking electrodes, comprising the projection of a heated pulverized carbon through a confined passage by means of heated compressed air, introducing pitch into the confined passage to mix with the pulverized carbon, and supplying to the mixture an oil for increasing its plasticity.

12. A process for preparing a mixture for the making of self-baking electrodes comprising the forcing of a heated prepared carbon through a pipe line by the use of heated compressed air, feeding into the pipe line through which the pulverized carbon is passing pitch, and adding to the mixture a tar oil to increase the plasticity.

13. A process for preparing a mixture for the manufacture of self-baking electrodes, comprising the feeding into a pipe line a prepared heated carbon, projecting said prepared carbon through the pipe line by means of heated compressed air, feeding into said pipe line to mix with the prepared carbon pitch, and adding to the mixture a tar oil for increasing the plasticity.

14. A process for mixing a pulverized solid with a binder, comprising the heating of said pulverized solid, the feeding of it through a pipe line by heated compressed air, and the mixing with the heated pulverized solid as it passes through the pipe line a binder to form a plastic mass.

15. In the process of combining pulverized solids to form a plastic mass for molding, the step of forcing the pulverized body-giving solids through a confined passage, and the step of spraying a binder onto said body-giving solids.

16. A method of producing a moldable material comprising the injecting into a confined passage a basic non-moldable material, propelling the basic non-moldable material along a passage toward a mold, and entraining into the moving mass successively material for rendering the resilient product moldable.

17. A method of producing a moldable material comprising the injecting into a confined passage a basic non-moldable material, propelling under the action of compressed air the basic non-moldable material along the passage and entraining into the moving mass successively material for rendering the resilient product moldable.

18. In a method of preparing material to be molded, the step of causing carbon to progress in the form of a confined flowing stream under the action of compressed air, and directing into the stream as it progresses additional ingredients of a character suitable to complete the moldable product.

19. In a method of preparing material to be molded, the step of causing carbon to progress in the form of a confined flowing stream under the action of compressed air, and introducing into the stream as it progresses pitch and oil to complete the moldable product.

JOHN M. STEPHENSEN.